(12) United States Patent
Kostrzewa et al.

(10) Patent No.: US 8,471,206 B1
(45) Date of Patent: Jun. 25, 2013

(54) INFRARED DETECTOR VACUUM TEST SYSTEMS AND METHODS

(75) Inventors: Joseph Kostrzewa, Buellton, CA (US); Russell D. Granneman, Santa Barbara, CA (US)

(73) Assignee: Flir Systems, Inc., Wilsonville, OR (US)

( * ) Notice: Subject to any disclaimer, the term of this patent is extended or adjusted under 35 U.S.C. 154(b) by 1011 days.

(21) Appl. No.: 12/502,883

(22) Filed: Jul. 14, 2009

(51) Int. Cl.
*G01J 5/46* (2006.01)

(52) U.S. Cl.
USPC .......................................... 250/340; 250/352

(58) Field of Classification Search
USPC ........................................................ 250/340
See application file for complete search history.

(56) References Cited

U.S. PATENT DOCUMENTS

| | | | |
|---|---|---|---|
| 5,386,920 A * | 2/1995 | Romano et al. | 220/2.2 |
| 5,433,639 A | 7/1995 | Zahuta et al. | |
| 5,550,398 A | 8/1996 | Kocian et al. | |
| 5,895,233 A * | 4/1999 | Higashi et al. | 438/107 |
| 6,077,046 A * | 6/2000 | Kennedy et al. | 417/48 |
| 6,499,354 B1 | 12/2002 | Najafi et al. | |
| 6,812,465 B2 | 11/2004 | Parrish et al. | |
| 7,309,865 B2 * | 12/2007 | Ikushima et al. | 250/338.1 |
| 7,364,932 B2 * | 4/2008 | Ikushima et al. | 438/53 |
| 7,385,199 B2 | 6/2008 | DeWames et al. | |
| 7,470,904 B1 | 12/2008 | Schweikert et al. | |
| 7,482,193 B2 * | 1/2009 | DCamp et al. | 438/51 |
| 7,563,635 B2 * | 7/2009 | Ikushima et al. | 438/55 |
| 7,745,923 B2 * | 6/2010 | Hirose et al. | 257/698 |
| 7,795,585 B2 * | 9/2010 | Sogawa et al. | 250/338.1 |
| 2004/0147056 A1 * | 7/2004 | McKinnell et al. | 438/52 |
| 2004/0219706 A1 * | 11/2004 | Wan | 438/53 |
| 2005/0176179 A1 * | 8/2005 | Ikushima et al. | 438/125 |
| 2005/0211900 A1 * | 9/2005 | Ouvrier-Buffet | 250/339.11 |
| 2005/0253283 A1 * | 11/2005 | DCamp et al. | 257/787 |
| 2006/0060785 A1 * | 3/2006 | Tinnes | 250/338.1 |
| 2006/0131501 A1 * | 6/2006 | Ikushima et al. | 250/338.1 |
| 2006/0214247 A1 * | 9/2006 | DCamp et al. | 257/416 |
| 2007/0278649 A1 * | 12/2007 | Hirose et al. | 257/688 |
| 2007/0298534 A1 * | 12/2007 | Ikushima et al. | 438/57 |
| 2008/0308920 A1 * | 12/2008 | Wan | 257/685 |
| 2009/0140146 A1 * | 6/2009 | Sogawa et al. | 250/338.1 |
| 2010/0288915 A1 * | 11/2010 | Endo | 250/252.1 |
| 2011/0114840 A1 * | 5/2011 | Yamazaki et al. | 250/338.1 |
| 2011/0158282 A1 * | 6/2011 | Hartman | 374/45 |

OTHER PUBLICATIONS

Loral, Phase II Government / Industry Briefing, Staring Dewar Mantech Program, Nov. 1995 (110 pages).

(Continued)

*Primary Examiner* — David Porta
*Assistant Examiner* — Djura Malevic
(74) *Attorney, Agent, or Firm* — Haynes and Boone, LLP

(57) ABSTRACT

Systems and methods are directed to determining the vacuum integrity within a vacuum package assembly containing an infrared detector, such as within an infrared imaging device. For example for an embodiment, a method of performing a vacuum pressure test on a vacuum package includes changing a first parameter value associated with an infrared detector within the vacuum package to vary a temperature of the infrared detector; measuring a second parameter value associated with the infrared detector based on the changing of the first parameter value; comparing the second parameter value to a threshold value; and determining a vacuum pressure condition of the vacuum package based on the comparing of the second parameter value to the threshold value.

20 Claims, 8 Drawing Sheets

OTHER PUBLICATIONS

Air Force Research Laboratory, AFRL-IF-RS-TR-2002-277 Final Technical Report, Raytheon Company, Vacuum Packaging for Microelectricmechanical Systems (MEMS), Oct. 2002 (70 pages).
Tilmans et al.; "The Indent Reflow Sealing (IRS) Technique . . . "; Journal of Microelectromechanical Systems; vol. 9; pp. 206-217; Jun. 2000.

Premachandran et al.: Vacuum Packaging Development and Testing for an Uncooled IR Bolometer Device, 2004 Electronic Components and Technology Conference; vol. 1, pp. 951-955; Jun. 2004.

\* cited by examiner

INFRARED DETECTOR VACUUM TEST SYSTEMS AND METHODS

TECHNICAL FIELD

One or more embodiments of the invention relate generally to infrared detectors and, more particularly, to techniques for measuring a vacuum pressure within a device used to encapsulate one or more infrared detectors.

BACKGROUND

Many different types of infrared detectors typically rely on high thermal isolation from the surrounding environment to achieve a desired level of performance. For example, an infrared detector may be encapsulated within a vacuum package to minimize thermal conduction via gas molecules.

A microbolometer and a silicon-on-insulator (SOI) diode are examples of these types of infrared detectors, which may be used within infrared cameras (e.g., various types of infrared imaging devices). The microbolometer and the SOI diode are typically fabricated on monolithic silicon substrates to form an image detector array, with each infrared detector of the image detector array functioning as a pixel to produce a two-dimensional image. The change in resistance of each infrared detector is translated into a time-multiplexed electrical signal by circuitry known as the read out integrated circuit (ROIC). The combination of the ROIC and the image detector array is commonly known as a focal plane array (FPA) or infrared FPA (IRFPA).

As noted, a typical FPA is situated within a vacuum package (also known as a vacuum package assembly) to provide a high vacuum environment that is generally required to achieve a desired sensitivity from the infrared detectors. However due to various factors (e.g., outgassing and/or leaks), the vacuum integrity of the vacuum package assembly degrades over time, which results typically in a gradual loss of vacuum pressure and consequently a reduction in sensitivity of the infrared detectors and an overall reduction in performance of the infrared camera.

A conventional approach to determine the vacuum integrity of the vacuum package is to measure the FPA's responsivity to calibrated temperature sources placed in front of the infrared camera's lens. However, the calibrated temperature sources add to the cost and complexity of the test and this approach may be difficult to perform as a field diagnostic (i.e., outside of the lab environment). Furthermore, this approach may not be accurate if the infrared camera lens or other optical path components are degraded, which may be the true source of the infrared camera's performance degradation.

As a result, there is a need for improved techniques to measure vacuum pressure of a vacuum package, such as for a microbolometer FPA of an infrared camera.

SUMMARY

Systems and methods are disclosed, in accordance with one or more embodiments, which are directed to determining the vacuum integrity within a vacuum package, such as within an infrared camera (e.g., any type of infrared imaging device). For example for an embodiment, systems and methods are disclosed to provide a vacuum test diagnostic function with respect to vacuum pressure within the vacuum package. The techniques may further include, for one or more embodiments, appropriate operations to perform based upon the vacuum test results.

More specifically, in accordance with one embodiment, a method of performing a vacuum pressure test on a vacuum package includes changing a first parameter value associated with an infrared detector within the vacuum package to vary a temperature of the infrared detector; measuring a second parameter value associated with the infrared detector based on the changing of the first parameter value; comparing the second parameter value to a threshold value; and determining a vacuum pressure condition of the vacuum package based on the comparing of the second parameter value to the threshold value.

In accordance with another embodiment, an infrared camera system includes a processing component; a memory component coupled to the processing component; and a vacuum package containing a plurality of infrared detectors. The processing component is adapted to perform a vacuum pressure test on the vacuum package, which includes: changing a first parameter value to vary a temperature of at least one of the infrared detectors within the vacuum package; measuring a second parameter value associated with the at least one infrared detector based on the changing of the first parameter value; comparing the second parameter value to a threshold value stored in the memory component; and determining a vacuum pressure condition of the vacuum package based on the comparing.

In accordance with another embodiment, a computer-readable medium stores information for performing a vacuum pressure test method for an infrared vacuum package assembly, where the method includes changing a first parameter value provided to the infrared vacuum package assembly containing an infrared detector to vary a temperature of the infrared detector while the infrared detector is exposed to a non-varying scene; measuring a second parameter value associated with the infrared detector based on the changing of the first parameter value; comparing the second parameter value to a threshold value; and determining a vacuum pressure test result for the infrared vacuum package assembly based on the comparing of the second parameter value to the threshold value.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Systems and methods are disclosed, in accordance with one or more embodiments, which are directed to determining a vacuum pressure (or vacuum integrity) within a vacuum package (e.g., within an infrared camera which may refer to any type of infrared imaging device). For example, various techniques are disclosed in accordance with one or more embodiments to provide a vacuum diagnostic function for an infrared camera, which may be capable of detecting that the vacuum package assembly (VPA) has lost its vacuum or that the vacuum pressure has degraded. In an embodiment, for example, the vacuum diagnostic function may provide a pass/fail verification and/or a quantitative diagnostic result as to how much vacuum life remains, which may be provided to a user and/or may be used to initiate various actions within the infrared camera based upon the vacuum test results.

Figure 1:
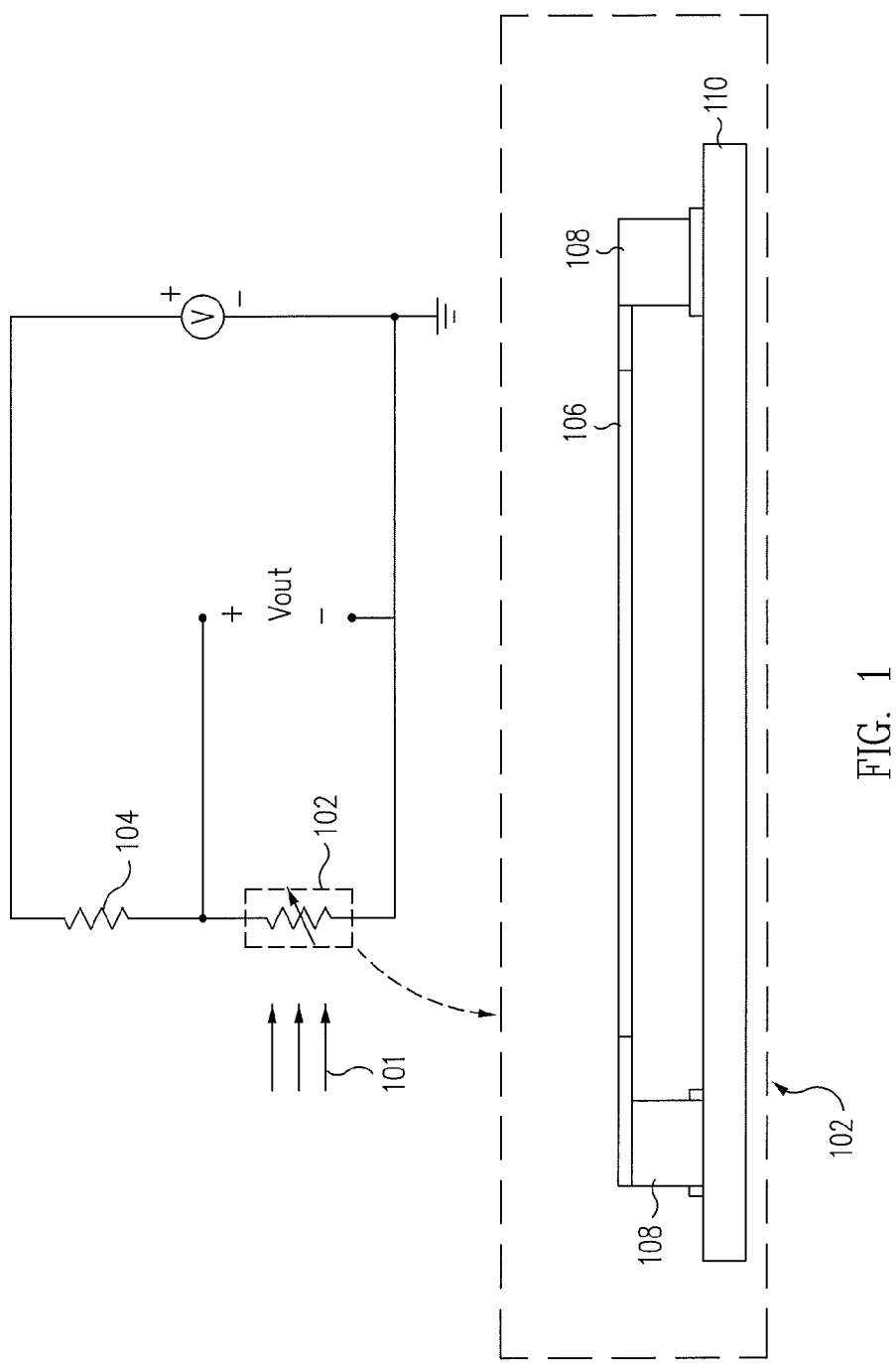
FIG. 1 shows a circuit diagram illustrating an example of a circuit for measuring microbolometer resistance along with a side view of a microbolometer in accordance with an embodiment.

FIG. 1 shows a circuit diagram illustrating an example of a circuit for measuring microbolometer resistance along with a side view of a microbolometer in accordance with one or more embodiments. However, FIG. 1 is not limiting and embodiments disclosed herein may be applied to a wide variety of temperature-sensing devices (e.g., infrared detectors), which exhibit self heating from the application of electrical bias, and associated circuitry configurations. Thus, although a microbolometer may be discussed in one or more embodiments as a specific implementation example, it should be understood that the techniques disclosed herein may be applied to a wide variety of temperature-sensing devices and associated circuit configurations.

As shown in FIG. 1, a voltage (V) is applied across the series combination of a microbolometer 102 and a resistive load ($R_{load}$) 104. Microbolometer 102 (also referred to as the active microbolometer) is thermally isolated from the substrate and receives incident infrared radiation 101, while resistive load ($R_{load}$) 104, which may also be a microbolometer (also referred to as the load microbolometer), is thermally shorted to the substrate. As an example, microbolometer 102 (e.g., cross-sectional side view example shown in FIG. 1) provides a bridge 106 via legs 108, with legs 108 providing structural support, thermal isolation, and electrical connectivity for bridge 106 to a substrate 110 (e.g., that includes the ROIC), as would be understood by one skilled in the art.

An output voltage ($V_{out}$) is measured across microbolometer 102 to determine its resistance ($R_{bolometer}$), according to the following equation (1).

$$R_{bolometer} = R_{load}/(V/V_{out}-1) \qquad (1)$$

Figure 2:
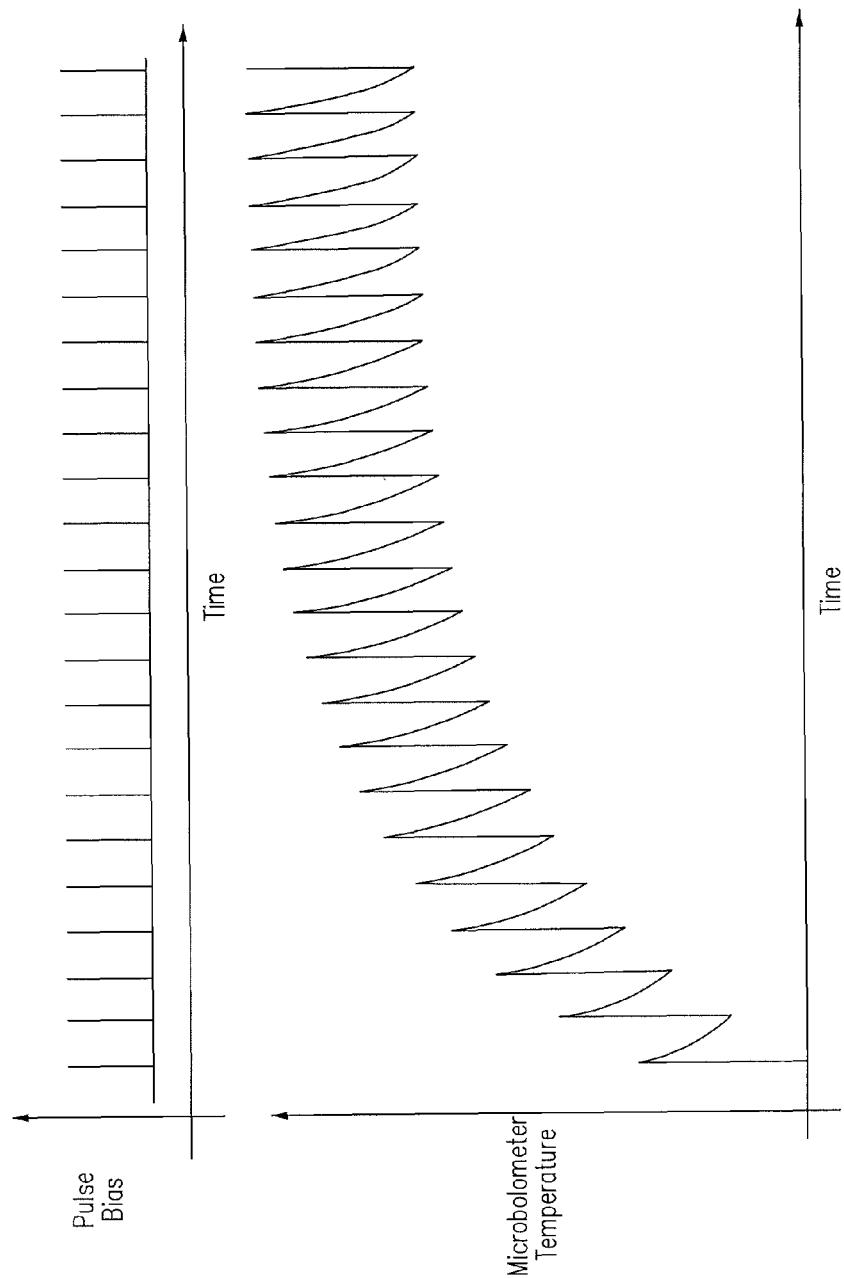
FIG. 2 shows a graph of microbolometer temperature over many sample (bias) periods in accordance with an embodiment.

The temperature rise in microbolometer 102 due to self-heating generally is significantly larger than the temperature rise resulting from the incident infrared radiation 101. If the voltage (V) is multiplexed or periodically applied during each sample period, the self-heating behavior may be as shown in FIG. 2. The microbolometer temperature rises significantly during each sample period (also referred to as a bias period and indicated by a pulse bias spike shown in FIG. 2). The microbolometer then cools exponentially, not reaching its pre-bias temperature before being biased again. This process is repeated until the microbolometer eventually reaches a steady-state in which its temperature does decay to a repeatable value before the next bias pulse.

Figure 3:
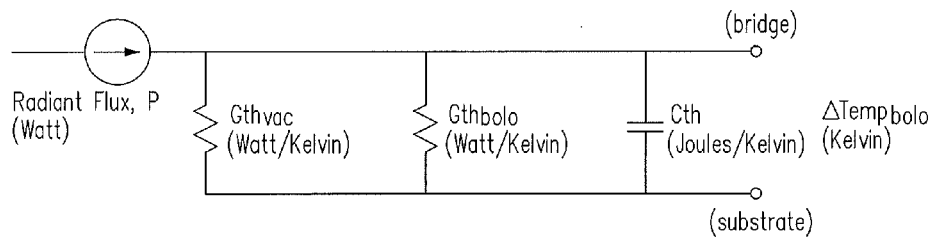
FIG. 3 shows a thermal impedance circuit for a microbolometer in accordance with an embodiment.

One of the reasons for encapsulating a microbolometer device, such as microbolometer 102, in a vacuum is to minimize thermal conductance between the substrate (e.g., substrate 110) and the bridge (e.g., bridge 106), thereby maximizing responsivity. As illustrated in FIG. 3, the total thermal conductance (i.e., the inverse of thermal resistance) can be envisioned as a parallel combination of the thermal conductance of the microbolometer structure itself, $Gth_{bolo}$, and that of any residual gas inside the package, $Gth_{vac}$, as illustrated in the following equation (2).

$$Gth_{total} = Gth_{bolo} + Gth_{vac} \qquad (2)$$
$$= (Rth_{bolo} + Rth_{vac})/(Rth_{bolo} \cdot Rth_{vac})$$

When radiant flux, P, is absorbed by the bridge, the temperature change, $\Delta Temp_{bolo}$, is inversely proportional to total thermal conductance as shown in equation (3).

$$\Delta Temp_{bolo} = P/Gth_{total} \qquad (3)$$

Therefore, thermal conductance should be minimized for highest responsivity. $Gth_{bolo}$ is primarily a function of leg properties (e.g., width, length, and material of legs 108), and there are practical constraints on its minimum value. For the microbolometer to be the performance limiter rather than the vacuum package, $Gth_{vac}$ must be significantly less than $Gth_{bolo}$.

Figure 4:
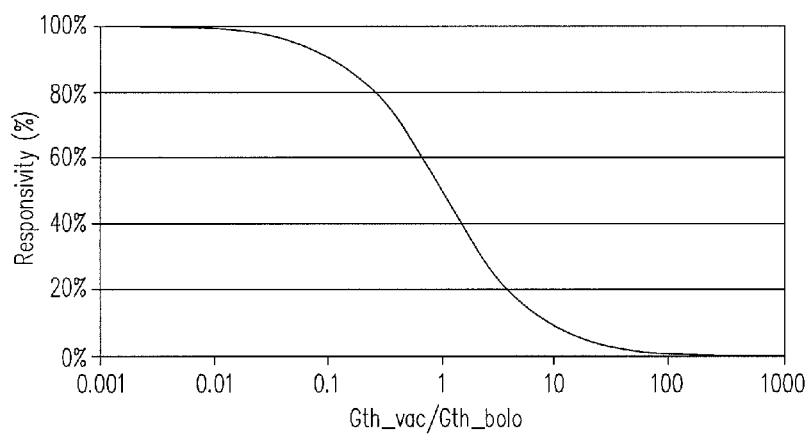
FIG. 4 shows a graph of responsivity versus thermal conductance for a microbolometer in accordance with an embodiment.

As an example, FIG. 4 illustrates responsivity as a function of $Gth_{vac}$ (normalized by $Gth_{bolo}$). Because $Gth_{vac}$ is proportional to pressure for high vacuum, FIG. 4 also represents the expected relationship between responsivity and vacuum pressure if the x-axis were recast in units of pressure. Ideally, the vacuum package operates on the extreme left of this curve throughout its service life (i.e., performance is dominated by $Gth_{bolo}$ rather than $Gth_{vac}$). For example, "end of life" for an infrared camera may be defined as the point at which responsivity is a certain percentage (e.g., 80%) of its initial value.

In a similar fashion, just as responsivity is inversely proportional to thermal conductivity, so too is the thermal time constant, as illustrated in equation (4).

$$\tau = Cth/Gth_{total} \qquad (4)$$

Consequently, FIG. 4 also represents the expected shape of a curve of thermal time constant versus vacuum pressure. In other words, a change in responsivity caused by a change in vacuum pressure should result in a proportional change to the thermal time constant (e.g., the time constant is a viable metric as an indicator of vacuum quality).

In general, responsivity measurements may be used as an indicator of vacuum life, such as, for example, to assess the performance of samples submitted to accelerated aging tests. However, responsivity is not an ideal metric for a field diagnostic because it requires two calibrated source temperatures to measure accurately. Furthermore, there are other infrared camera problems that may cause degraded responsivity, such as for example an abraded or dirty window and/or lens.

Figure 5:
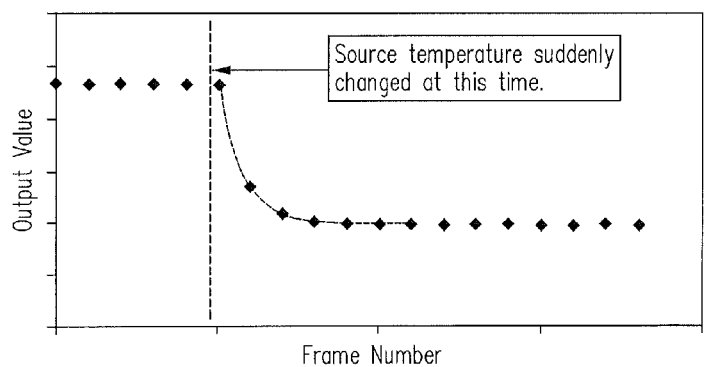
FIG. 5 shows a graph of output signal over a number of frames in response to a step change in stimulus for a microbolometer in accordance with an embodiment.

For example, a method of measuring time constant involves suddenly replacing one source temperature with a second, sufficiently different source temperature. The change in microbolometer output is tracked, and an exponential curve is fit to the data, such as illustrated in FIG. 5. Following a sudden change in source temperature at t=0, the theoretical pixel output value can be predicted as in equation (5):

$$\Delta counts(t) = \Delta counts_{ss} \cdot (1 - \exp(-t/\tau)), \quad (5)$$

where t is the elapsed time between the change of source temperature and readout of the microbolometer (e.g., pixel), and $\Delta counts_{ss}$ is the total steady-state change in microbolometer output (i.e., the change after many time constants have elapsed).

A hypothetical measurement of time constant might proceed as in the following operations: 1) an object in the field of view (FOV) produces an output value of 7000 digital counts; 2) the shutter is closed, and one frame later (time=t) the output value is 6050 digital counts; and 3) many frames later, the output value is steady at 6000 counts. The time constant may be calculated as in equation (6).

$$\tau_1 = t/-\ln(50/1000) = t/3 \quad (6)$$

In this measurement, the change in output at time=t is to within 5% of the total steady-state change. If the same process was repeated at some later date, and it was then found that the change in output at time=t was to within 1.8% of the total steady-state change, one could infer that the time constant was now reduced to 75% of its original value, as show in equation (7).

$$\tau_2 = t/-\ln(1.8\%) = t/4 = \frac{3}{4} \cdot \tau_1 \quad (7)$$

One of the problems associated with measuring thermal time-constant this way is that the value of $\Delta counts_{ss}$ must be fairly large in comparison to the noise floor of the detector. In the previous example, a change in time constant was detected as a mere 3.2% difference in the amount of settling. If the value of $\Delta counts_{ss}$ were 100 counts rather than 1000 counts, a 25% decrease in thermal time constant would represent only 3.2 counts settling difference, a value highly subject to measurement error resulting from random noise.

Another problem with this method of measuring time constant is the repeatability of the value "t", the elapsed time between blocking a given pixel with the shutter and the next readout of that pixel. For example, the shutter swipe may not be synchronized with readout timing. Consequently, the value of "t" varies across the FOV. This may be particularly true if the read order is in the opposite direction of the shutter swipe, i.e., first row covered by the shutter is the last row to be read.

One way to overcome this problem is to always measure the time constant from an identical location in the FOV (i.e., a small subset of the total array). However, this puts yet another constraint on measurement conditions—not only must there be a suitably hot source in the FOV, but it must also be in a pre-defined location. For a depot-level diagnostic (e.g., in an infrared camera service facility), this might be acceptable. However, it would be problematic for a diagnostic intended to operate on command or automatically as a background test during normal infrared camera operation in the field. Furthermore, problems with the shutter (e.g., inconsistent shutter speed) may cause the diagnostic to erroneously flag an infrared sensor (e.g., vacuum pressure) problem.

Whereas the above method for measuring time constant involves a scene-induced change of microbolometer temperature, alternative methods are further disclosed herein in accordance with one or more embodiments that are based on microbolometer self-heating (e.g., bias heating). For example, the thermal impedance circuit of FIG. 3 shows radiant flux as the power source that causes the microbolometer to change temperature. However, power dissipation from bias current is another source of microbolometer heating.

Figure 6:
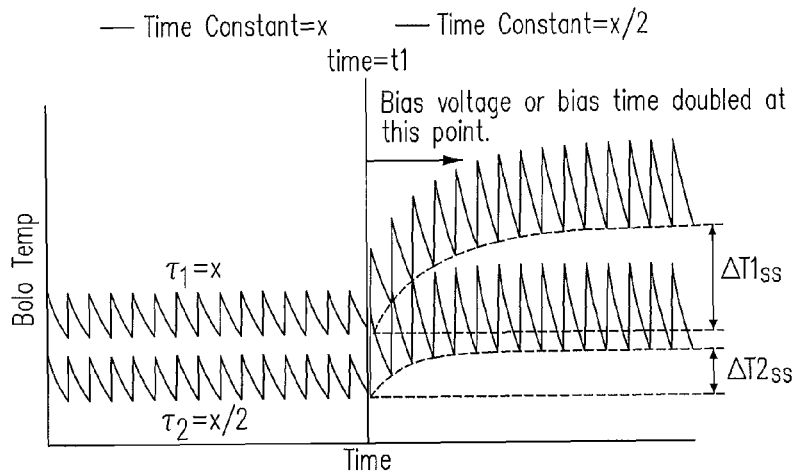
FIG. 6 shows a graph of microbolometer temperature curves over time for a microbolometer with a change in bias voltage or bias time in accordance with an embodiment.

For example, FIG. 6 shows two hypothetical curves of microbolometer temperature (bolo temp) as a function of time. Prior to time t1, the microbolometer (or device) has reached a steady-state in which its temperature decays to a repeatable value before the next bias pulse. Starting at time t1, the bias voltage and/or bias time is increased such that the bias heating from each pulse is greater than that prior to t1. This in turn causes the temperature of the device to increase gradually to a new steady-state value.

FIG. 6 shows the temperature profile for two different values of time constant and as illustrated, the steady-state temperature is lower for a faster time constant (i.e., x/2) as there is greater temperature decay between bias cycles. Thus in accordance with an embodiment, FIG. 6 illustrates an approach for implementing a vacuum diagnostic: changing the bias voltage and/or bias time while imaging a static source (e.g., shutter) and observing the value of $\Delta T_{ss}$.

In accordance with an embodiment, a vacuum diagnostic may also be implemented by noting that when the bias voltage and/or bias time is changed, the temperature profile transitions from one steady-state value to another, as illustrated in FIG. 6. Not only is the magnitude of the transition dependent upon the thermal time constant (as discussed above), but so too is the rate of the transition. For example, a time constant may be measured by using a change in bias voltage and/or bias time rather than a change in scene temperature to generate the required microbolometer temperature change. In general, this approach may be independent of FPA temperature and scene temperature, resulting in a robust diagnostic that is fairly simple to execute.

Figure 7:
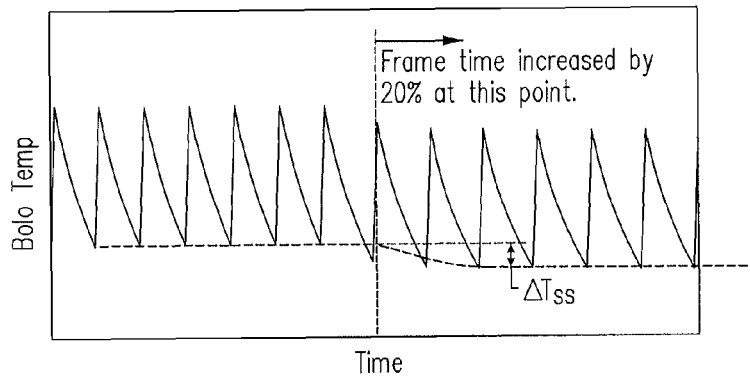
FIG. 7 shows a graph of a microbolometer temperature curve over time with a change in bias duty cycle in accordance with an embodiment.

Another vacuum pressure test approach may be performed based on a measurement of output shift after a change of bias duty cycle in accordance with an embodiment. For example, FIG. 7 shows a hypothetical curve of microbolometer temperature versus time when a frame time is increased midway through the plot (without a proportional change to bias time). As a specific example, the frame time change may represent a change when a microbolometer is switched from NTSC (National Television Standard Committee) timing (30 Hz) to PAL (Phase Alternating Line) timing (25 Hz). Because there is more time for decay between bias cycles, the steady-state temperature decreases. This change in steady-state temperature, $\Delta T_{ss}$, corresponds to a reduction in pixel output.

If the thermal time constant is reduced because of a change in vacuum pressure, the value of $\Delta T_{ss}$ is expected to decrease. For example, FIG. 8 shows a graph of microbolometer temperature versus time after a frame timing change for two values of time constants ($\tau = x$ and $x/2$), with the reduction of $\Delta T_{ss}$ essentially due to the difference $e^{-t1/\tau} - e^{t2/\tau}$ being greater for higher (slower) values of $\tau$, such as for example as illustrated in equation (8).

$$e^{-3} - e^{-4} > e^{-6} - e^{-8} \quad (8)$$

Figure 8:
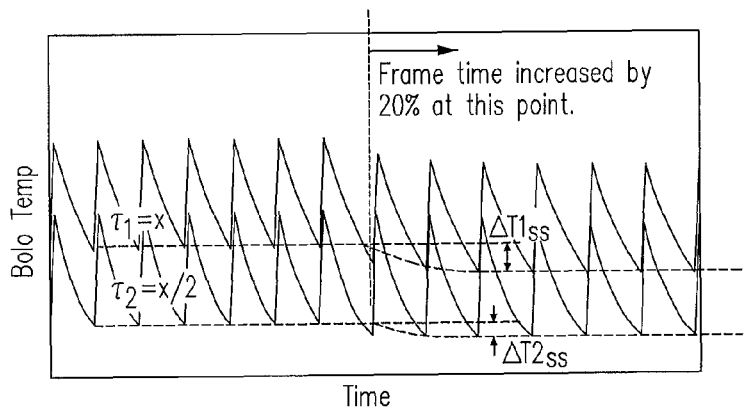
FIG. 8 shows a graph of microbolometer temperature curves over time with a change in bias duty cycle in accordance with an embodiment.

Thus in accordance with an embodiment, FIG. 8 illustrates an approach for implementing a vacuum diagnostic: changing the frame timing while imaging a static source and observing the value of $\Delta T_{ss}$.

In accordance with an embodiment, a vacuum diagnostic may also be implemented by noting that when the frame timing is changed, the temperature profile transitions from one steady-state value to another, as illustrated in FIG. 8. The rate of transition is an exponential function of thermal time constant, just as for a change induced by modifying bias voltage or bias time. Thus, a time constant may be measured by using a change in frame timing (i.e., bias duty cycle).

In accordance with one or more embodiments, techniques are disclosed for performing a vacuum pressure test for a vacuum package assembly, such as for an infrared camera. For example for one or more embodiments, a vacuum diagnostic function is disclosed that does not require a scene-based change (e.g., calibrated, external temperature sources to image), but rather provides a change in biasing (e.g., microbolometer bias voltage and/or bias time), a change in the bias duty cycle (e.g., frame time change), and/or a change in an associated parameter that results in a change in the microbolometer temperature.

As a specific example for an embodiment, a microbolometer bias voltage and/or voltage bias time (Vload or V, e.g., as in FIG. 1 and in reference to FIG. 6) and/or a microbolometer bias duty cycle (e.g., as in FIGS. 7 and 8) may be changed to induce a new level of bias heating for the microbolometer. Thus, the microbolometer will have a new steady-state microbolometer temperature and, if applied to the entire microbolometer array (e.g., FPA), a new average output value for the microbolometer array. As an example for one or more embodiments, a time constant (or time to transition to the new steady state) may be determined by observing the microbolometer output or the array output as it transitions from one steady state value to the next.

As a specific example, the initial time constant of a newly packaged device may be on the order of 12 msec, with the "fail" condition for example set to 80% of the initial value, or 9.6 msec nominally. Consequently, if a change to the bias heating induces a steady-state difference in array output of X counts, the transition one 60 Hz field after the bias change would be approximately as set forth in equation (9), when the vacuum package assembly is new, and as set forth in equation (10) for when the vacuum package assembly has aged to 80% of its starting value.

$$\exp(-1/60*0.012)*X = 0.75X \quad (9)$$

$$\exp(-1/60*0.0096)*X = 0.82X \quad (10)$$

For this specific example, equations (9) and (10) illustrate that there is approximately a 10% increase in decay over a single field, and if X is a fairly large value, say 1000 counts for the microbolometer (or array) output signal, the test may provide a reliable metric for determining vacuum pressure status within the vacuum package assembly.

In accordance with one or more embodiments, measurements may be performed to determine threshold levels of performance over an expected operating range of the vacuum package assembly (e.g., within an infrared camera). For example, for an embodiment and in reference to the specific example above, the value of X (or the difference in the value of X) may be determined (e.g., by the manufacturer) for various temperatures within a given temperature range. Therefore for example, when a vacuum pressure diagnostic is performed, such as in the field by a user or automatically by the infrared camera, the test results may be compared to a threshold value based on the temperature associated with the vacuum package assembly at the time of the field test. Thus for example, if the value of X varies as a function of temperature, the field measurement may be made at any temperature, T, and compared to the calibrated value of X(T).

The calibrated value of X(T), as an example, may be stored in a lookup table and interpolated from calibrated measurements provided at a few temperatures within the expected operating range. The calibrated value of X(T) may also be stored along with an associated expected time duration to reach the calibrated value of X(T) after parameter variation (e.g., change in bias voltage or frame timing) in accordance with one or more embodiments. Alternatively, rather than storing X(T), only the calibrated expected time values to reach steady state may be stored in a lookup table and interpolated from calibrated measurements provided at a number of temperatures within the expected operating range. Also as noted above, the field test may be performed automatically, in accordance with one or more embodiments, with the field test performed periodically based on time (e.g., every 3 months), events (e.g., after certain number of start-ups), and/or based on some other triggering event (including user initiated).

Figure 9:
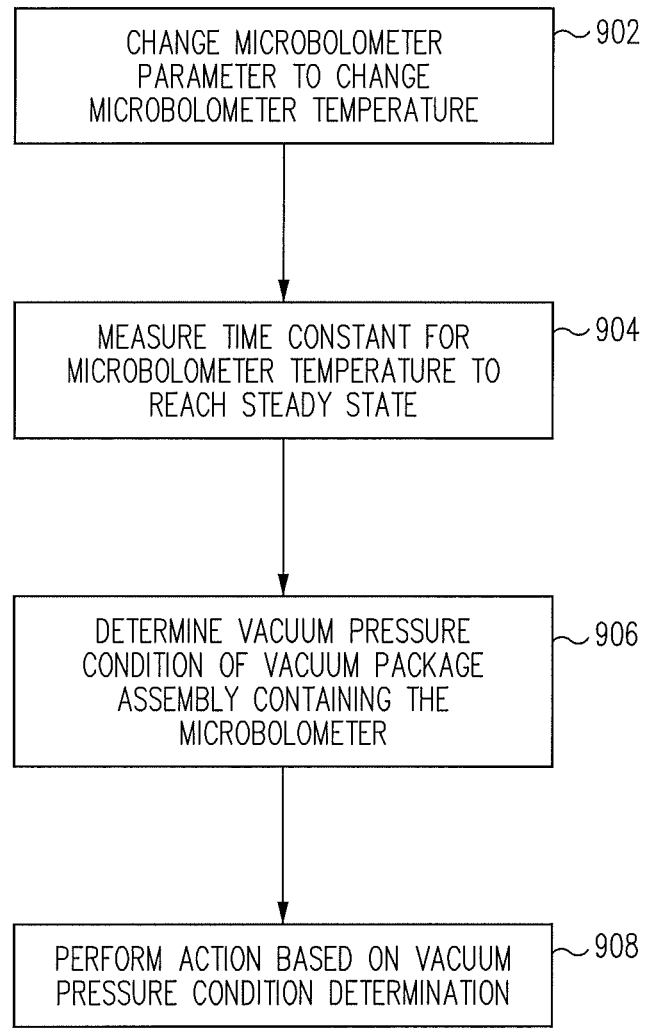
FIG. 9 shows a flowchart example for determining vacuum pressure integrity for a vacuum package assembly in accordance with an embodiment.

As an example, FIG. 9 shows a flowchart example for determining vacuum pressure for a vacuum package assembly in accordance with one or more embodiments. The vacuum pressure diagnostic, as shown in FIG. 9, may be performed for a microbolometer (or for a number of microbolometers such as an array) within the vacuum package assembly. Additionally, although a microbolometer is referred to in reference to FIG. 9, it should be understood as noted herein that the microbolometer represents a specific implementation example and that the techniques disclosed herein may be applied to other types of infrared detectors as would be understood by one skilled in the art.

With the microbolometer (or other type of infrared detector) at a steady state, a parameter is changed to induce a change in the microbolometer temperature (block 902). The microbolometer may be receiving infrared radiation from a non-changing scene (static scene), such as a shutter, a lens cap, or the microbolometer may be situated such that the microbolometer never receives incident infrared radiation (e.g., a shielded or covered microbolometer). The parameter changed may be the bias (e.g., bias voltage) and/or the bias time and/or the bias duty cycle (e.g., frame time) or any other parameter that results in a change in the microbolometer temperature (e.g., due to self heating).

The time constant is measured for the microbolometer temperature to reach approximately the new steady state (block 904). Thus, the time is measured for the microbolometer temperature to transition approximately from one steady state to another steady state temperature or to some approximation of these values (e.g., including rate of change). The vacuum pressure condition of the vacuum package assembly containing the microbolometer may then be determined by comparing the measured time constant to a corresponding threshold value stored (block 906). The threshold value, for example, may be selected from stored threshold values (e.g., within a lookup table or other database) that corresponds to and is associated with the temperature conditions of the test. As an example, the threshold value may be generated through interpolation or other known mathematical operations to generate the most appropriate threshold value for the given temperature conditions, as would be understood by one skilled in the art.

The vacuum pressure diagnostic test results may be stored, displayed to a user, or may be used to determine further action in accordance with one or more embodiments (block 908). For example, the test results, such as pass or fail or indication of life remaining may be displayed to the user for reference. If a fail condition is displayed, the user may be prompted to have the infrared camera repaired or take some other corrective action or diagnostic test. As another example, the infrared camera may perform some action, such as adjusting various infrared camera settings (e.g., automatic gain control, signal processing algorithm adjustments, etc.) to compensate for any potential degradations due to the vacuum pressure state. As a further example, a getter within the vacuum package assembly may be fired to improve vacuum pressure within the vacuum package assembly.

Figure 10:
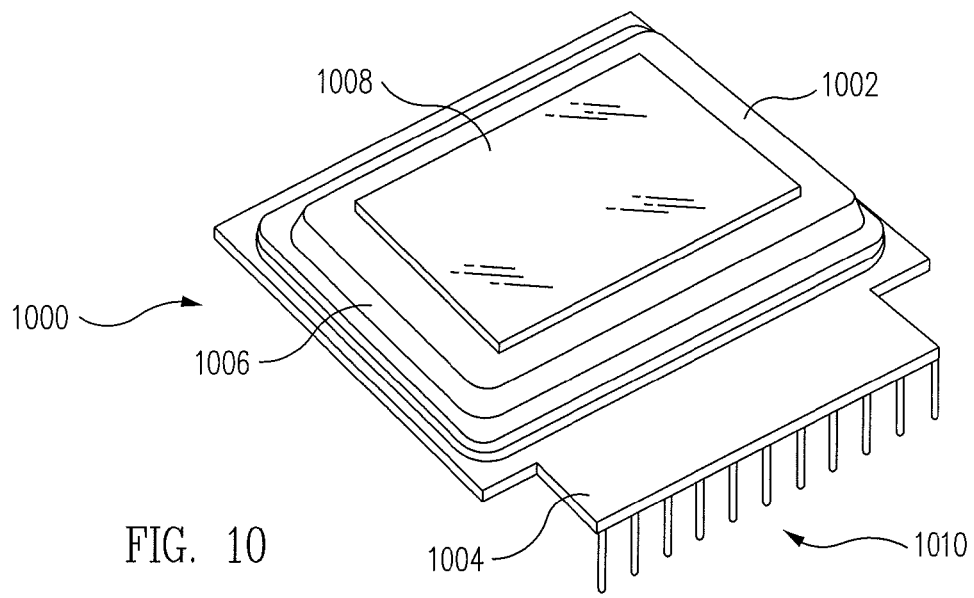
FIG. 10 shows a perspective view illustrating a vacuum package assembly in accordance with an embodiment.

For example, FIG. 10 shows an example of a vacuum package assembly 1000 in accordance with one or more embodiments. Vacuum package assembly 1000 provides a sealed container 1002 that contains the microbolometer (e.g., microbolometer array) and includes a lower housing section 1004 and an upper housing section 1006 with an infrared-transmissive window 1008. Lower housing section 1004 extends away from upper housing section 1006 and provides a plurality of contact pins 1010 to facilitate electrical communication between components (e.g., microbolometer array) within sealed container 1002 and external devices (e.g., processor, memory, etc., of the infrared camera). Contact pins 1010 may be received within a socket or other type of connector, for example.

Figure 11:
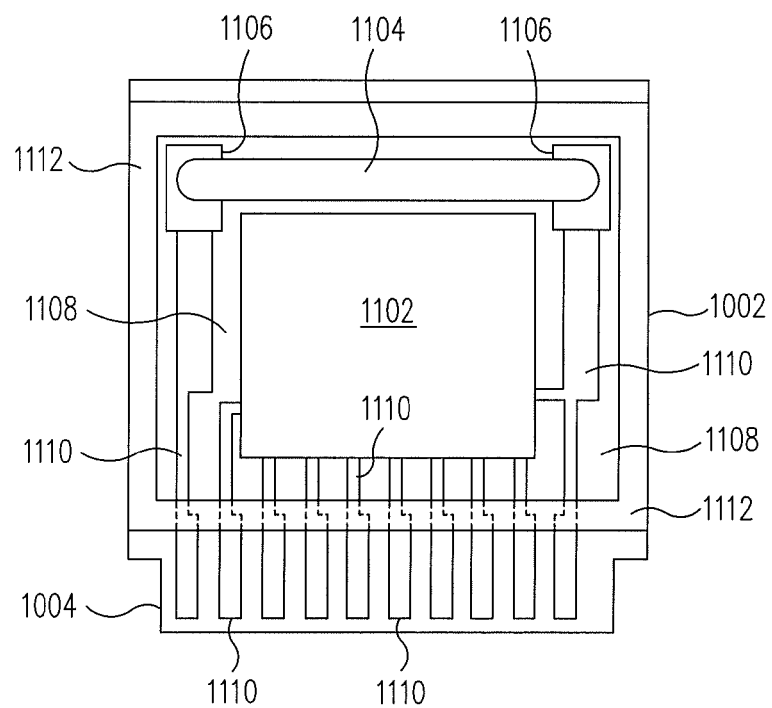
FIG. 11 shows a plan view example illustrating an inside of the vacuum package assembly of FIG. 10 in accordance with an embodiment.

FIG. 11 shows a plan view example of vacuum package assembly 1000 in accordance with an embodiment. Vacuum package assembly 1000 includes a microbolometer array 1102 along with an optional getter 1104 inside sealed container 1002. Getter 1104 may be used to adsorb undesirable gases from inside of sealed container 1002 and thereby improve vacuum pressure after sealed container 1002 has been sealed. Getter 1104 extends between Kovar blocks 1106 through which current can be communicated to getter 1104. Metal traces 1110 may be provided (e.g., on an inner surface 1108 of lower housing section 1004 and through an insulating ring 1112) to provide electrical communications between getter 1104 and microbolometer array 1102 and contact pins 1010 (FIG. 10). Thus, as noted above for an embodiment, getter 1104 may be fired within sealed container 1002 to improve vacuum pressure if the vacuum pressure diagnostic test results (e.g., FIG. 9) indicate a sufficient degradation in vacuum pressure within sealed container 1002.

Figure 12:
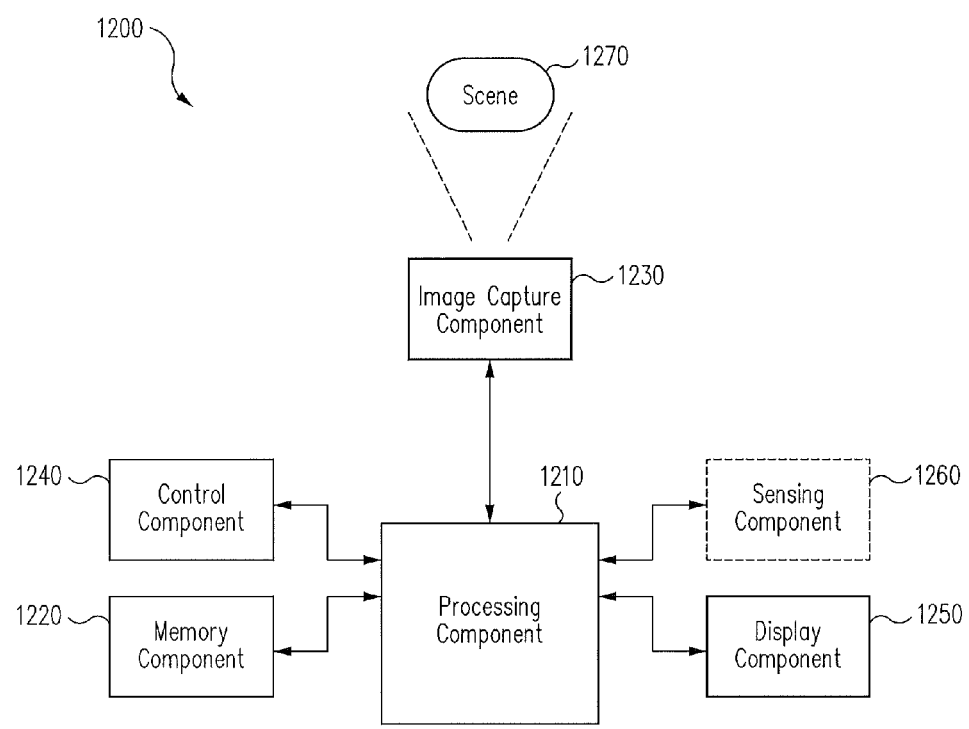
FIG. 12 shows a block diagram illustrating an infrared camera in accordance with one or more embodiments.

In accordance with one or more embodiments, vacuum pressure tests may be performed on a vacuum package assembly, such as within an infrared camera. For example, FIG. 12 shows a block diagram illustrating a system 1200 (e.g., an infrared camera, including any type of infrared imaging system) for capturing images and processing in accordance with one or more embodiments. System 1200 comprises, in one implementation, a processing component 1210, a memory component 1220, an image capture component 1230, a control component 1240, and a display component 1250. Optionally, system 1200 may include a sensing component 1260.

System 1200 may represent, for example, an infrared imaging device, such as an infrared camera, to capture and process images, such as video images of a scene 1270. The system 1200 may represent any type of infrared camera that employs detectors which are thermally isolated from the surrounding environment, which change temperature with time constant proportional to thermal conductance, and which exhibit bias heating (e.g., microbolometers and SOI diodes). System 1200 may comprise a portable device and may be incorporated, e.g., into a vehicle (e.g., an automobile or other type of land-based vehicle, an aircraft, or a spacecraft) or a non-mobile installation requiring infrared images to be stored and/or displayed or may comprise a distributed networked system (e.g., processing component 1210 distant from and controlling image capture component 1230 via the network).

In various embodiments, processing component 1210 may comprise any type of a processor or a logic device (e.g., a programmable logic device (PLD) configured to perform processing functions). Processing component 1210 may be adapted to interface and communicate with components 1220, 1230, 1240, and 1250 to perform method and processing steps and/or operations, as described herein such as controlling biasing and other functions (e.g., values for elements such as variable resistors and current sources, switch settings for biasing and timing such as for microbolometer bias values, microbolometer bias time, microbolometer bias duty cycle (frame timing), and other parameters) along with conventional system processing functions as would be understood by one skilled in the art.

Memory component 1220 comprises, in one embodiment, one or more memory devices adapted to store data and information, including for example infrared data and information. Memory device 1220 may comprise one or more various types of memory devices including volatile and non-volatile memory devices, including computer-readable medium (portable or fixed). Processing component 1210 may be adapted to execute software stored in memory component 1220 so as to perform method and process steps and/or operations described herein.

Image capture component 1230 comprises, in one embodiment, one or more infrared sensors (e.g., any type of multi-pixel infrared detector, such as a focal plane array) for capturing infrared image data (e.g., still image data and/or video data) representative of an image, such as scene 1270. In one implementation, the infrared sensors of image capture component 1230 provide for representing (e.g., converting) the captured image data as digital data (e.g., via an analog-to-digital converter included as part of the infrared sensor or separate from the infrared sensor as part of system 1200). In one or more embodiments, image capture component 1230 may further represent or include a lens, a shutter, and/or other associated components along with the vacuum package assembly (e.g., FIG. 11) for capturing infrared image data. Image capture component 1230 may further include temperature sensors (or temperature sensors may be distributed within system 1200) to provide temperature information to processing component 1210 as to operating temperature of image capture component 1230.

In one aspect, the infrared image data (e.g., infrared video data) may comprise non-uniform data (e.g., real image data) of an image, such as scene 1270. Processing component 1210 may be adapted to process the infrared image data (e.g., to provide processed image data), store the infrared image data in memory component 1220, and/or retrieve stored infrared image data from memory component 1220. For example, processing component 1210 may be adapted to process infrared image data stored in memory component 1220 to provide processed image data and information (e.g., captured and/or processed infrared image data).

Control component 1240 comprises, in one embodiment, a user input and/or interface device, such as a rotatable knob (e.g., potentiometer), push buttons, slide bar, keyboard, etc., that is adapted to generate a user input control signal. Processing component 1210 may be adapted to sense control input signals from a user via control component 1240 and respond to any sensed control input signals received therefrom. Processing component 1210 may be adapted to interpret such a control input signal as a parameter value, as generally understood by one skilled in the art. In one embodiment, control component 1240 may comprise a control unit (e.g., a wired or wireless handheld control unit) having push buttons adapted to interface with a user and receive user input control values. In one implementation, the push buttons of the control unit may be used to control various functions of the system 1200, such as autofocus, menu enable and selection, field of view, brightness, contrast, noise filtering, high pass filtering, low pass filtering, and/or various other features as understood by one skilled in the art.

Display component 1250 comprises, in one embodiment, an image display device (e.g., a liquid crystal display (LCD) or various other types of generally known video displays or monitors). Processing component 1210 may be adapted to display image data and information on the display component 1250. Processing component 1210 may be adapted to retrieve image data and information from memory component 1220 and display any retrieved image data and information on display component 1250. Display component 1250 may comprise display electronics, which may be utilized by processing component 1210 to display image data and information (e.g., infrared images). Display component 1250 may be adapted to receive image data and information directly from image capture component 1230 via the processing component 1210, or the image data and information may be transferred from memory component 1220 via processing component 1210.

Furthermore for example for one or more embodiments, processing component 1210 may initiate (or by user command via control component 1240) a vacuum pressure diagnostic test to be performed on image capture component 1230 (e.g., vacuum package assembly 1000), as disclosed herein. Processing component 1210 may then display the test results via display component 1250 to the user and or perform various actions based on the test results, as disclosed herein.

Optional sensing component 1260 comprises, in one embodiment, one or more sensors of various types, depending on the application or implementation requirements, as would be understood by one skilled in the art. The sensors of optional sensing component 1260 provide data and/or information to at least processing component 1210. In one aspect, processing component 1210 may be adapted to communicate with sensing component 1260 (e.g., by receiving sensor information from sensing component 1260) and with image capture component 1230 (e.g., by receiving data and information from image capture component 1230 and providing and/or receiving command, control, and/or other information to and/ or from one or more other components of system 1200).

In various implementations, sensing component 1260 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 1260 may represent conventional sensors as generally known by one skilled in the art for monitoring various conditions (e.g., environmental conditions) that may have an effect (e.g., on the image appearance) on the data provided by image capture component 1230.

In some implementations, optional sensing component 1260 (e.g., one or more of sensors) may comprise devices that relay information to processing component 1210 via wired and/or wireless communication. For example, optional sensing component 1260 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of system 1200 may be combined and/or implemented or not, as desired or depending on the application or requirements, with system 1200 representing various functional blocks of a related system. In one example, processing component 1210 may be combined with memory component 1220, image capture component 1230, display component 1250, and/or optional sensing component 1260. In another example, processing component 1210 may be combined with image capture component 1230 with only certain functions of processing component 1210 performed by circuitry (e.g., a processor, a microprocessor, a logic device, a microcontroller, etc.) within image capture component 1230. Furthermore, various components of system 1200 may be remote from each other (e.g., image capture component 1230 may comprise a remote sensor with processing component 1210, etc. representing a computer that may or may not be in communication with image capture component 1230).

Figure 13:
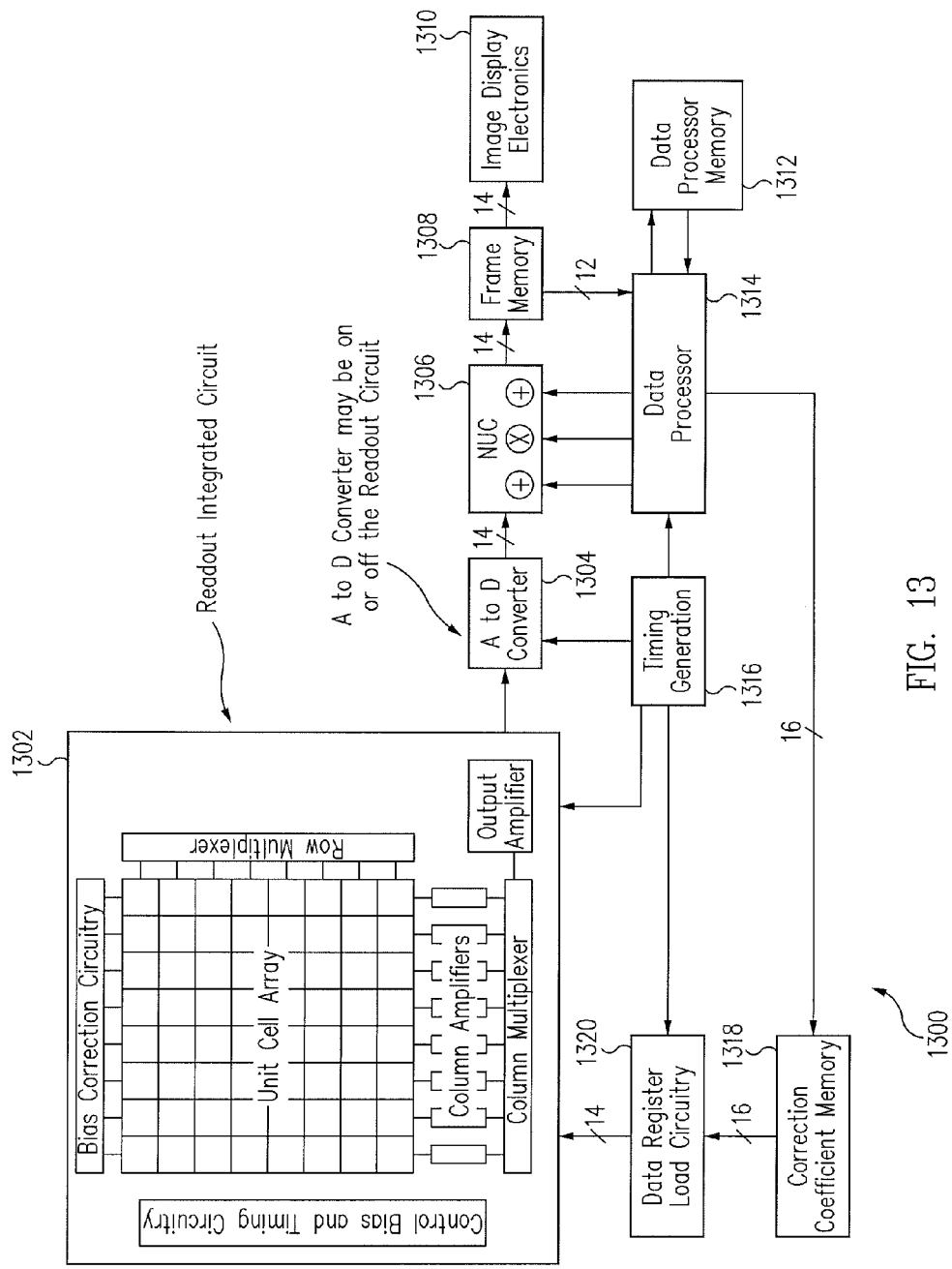
FIG. 13 shows a block diagram illustrating another implementation example for an infrared camera in accordance with one or more embodiments.

FIG. 13 shows a block diagram illustrating a specific implementation example for an infrared camera 1300 in accordance with one or more embodiments. Infrared camera 1300 may represent a specific implementation of system 1200 (FIG. 12), as would be understood by one skilled in the art.

Infrared camera 1300 (e.g., a microbolometer readout integrated circuit with bias-correction circuitry and interface system electronics) includes a readout integrated circuit (ROIC) 1302, which may include the microbolometer unit cell array, control circuitry, timing circuitry, bias circuitry, row and column addressing circuitry, column amplifiers, and associated electronics to provide output signals that are digitized by an analog-to-digital (A/D) converter 1304. The A/D converter 1304 may be located as part of or separate from ROIC 1302.

The output signals from A/D converter 1304 are adjusted by a non-uniformity correction circuit (NUC) 1306, which applies temperature dependent compensation as would be understood by one skilled in the art. After processing by NUC 1306, the output signals are stored in a frame memory 1308. The data in frame memory 1308 is then available to image display electronics 1310 and a data processor 1314, which also has a data processor memory 1312. A timing generator 1316 provides system timing.

Data processor 1314 generates bias-correction data words, which are loaded into a correction coefficient memory 1318. A data register load circuit 1320 provides the interface to load the correction data into readout integrated circuit 1302. In this fashion, variable circuitry such as variable resistors, digital-to-analog converters, biasing circuitry, which control voltage levels, biasing, frame timing, circuit element values, etc., are controlled by data processor 1314 so that the output signals from ROIC 1302 are uniform over a wide temperature range. Data processor 1314 may also be used to perform the vacuum pressure diagnostic tests, as disclosed herein, to control bias voltages and bias timing, as would be understood by one skilled in the art.

It should be understood that various functional blocks of infrared camera 1300 may be combined and various functional blocks may also not be necessary, depending upon a specific application and specific requirements. For example, data processor 1314 may perform various functions of NUC 1306, while various memory blocks, such as correction coefficient memory 1318 and frame memory 1308, may be combined as desired.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the invention. Where applicable, various hardware components and/or software components set forth herein may be separated into subcomponents having software, hardware, and/or both without departing from the scope and functionality of the invention. Where applicable, it is contemplated that software components may be implemented as hardware components and vice-versa.

Software, in accordance with the invention, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected is:

1. A method of performing a vacuum pressure test on a vacuum package, the method comprising:
    changing a first parameter value associated with an infrared detector within the vacuum package to vary a temperature of the infrared detector, wherein the first parameter value is a bias voltage value, a bias time value, and/or a bias duty-cycle value;
    measuring a second parameter value associated with the infrared detector based on the changing of the first parameter value, wherein the second parameter value is a time for an output signal of the infrared detector to transition from a first steady state value to a second steady state value;
    comparing the second parameter value to a threshold value; and
    determining a vacuum pressure condition of the vacuum package based on the comparing of the second parameter value to the threshold value.

2. The method of claim 1, wherein the first parameter value is a bias time value and/or a bias duty-cycle value.

3. The method of claim 1, wherein the first parameter value comprises the bias duty-cycle value that represents a frame time value.

4. The method of claim 1, comprising:
    determining a temperature associated with the infrared detector during the measuring of the second parameter value; and
    selecting the threshold value from a plurality of threshold values associated with corresponding temperatures based on the temperature from the determining.

5. The method of claim 4, wherein the selecting the threshold value further comprises generating the threshold value from a mathematical approximation based on certain ones of the plurality of threshold values.

6. The method of claim 1, comprising:
    storing the vacuum pressure condition from the determining;
    performing periodically the vacuum pressure test; and
    displaying the vacuum pressure condition to a user, wherein the infrared detector is incorporated within an infrared camera.

7. The method of claim 1, comprising:
    storing the vacuum pressure condition from the determining, wherein the infrared detector is incorporated within an infrared camera; and
    performing an action within the infrared camera based on the vacuum pressure condition.

8. The method of claim 7, wherein the performing an action comprises adjusting a setting of the infrared camera to compensate for the vacuum pressure condition.

9. The method of claim 7, wherein the performing an action comprises firing a getter within the vacuum package.

10. An infrared camera system, comprising:
    a processing component;
    a memory component coupled to the processing component; and
    a vacuum package containing a plurality of infrared detectors;
    wherein the processing component is adapted to perform a vacuum pressure test on the vacuum package, comprising:
        changing a first parameter value to vary a temperature of at least one of the infrared detectors within the vacuum package, wherein the first parameter value is a bias voltage value, a bias time value, and/or a bias duty-cycle value;
    measuring a second parameter value associated with the at least one infrared detector based on the changing of the first parameter value, wherein the second parameter value is a time for an output signal of the at least one infrared detector to transition from a first steady state value to a second steady state value;
        comparing the second parameter value to a threshold value stored in the memory component; and
        determining a vacuum pressure condition of the vacuum package based on the comparing.

11. The system of claim 10, wherein the first parameter value is a bias time value and/or a bias duty-cycle value.

12. The system of claim 11, wherein the second parameter value comprises the bias duty-cycle value that represents a frame time value.

13. The system of claim 10, wherein the memory component stores a plurality of threshold values associated with corresponding operating temperatures of the at least one infrared detector, and wherein the vacuum pressure test performed by the processing component comprises:
    determining an operating temperature associated with the at least one infrared detector during the measuring of the second parameter value; and
    determining the threshold value from a plurality of threshold values associated with corresponding temperatures based on the temperature from the determining of the operating temperature.

14. The system of claim 10, wherein the system further comprises a display coupled to the processing component, and wherein the vacuum pressure test performed by the processing component comprises:
- storing the vacuum pressure condition from the determining in the memory component;
- displaying the vacuum pressure condition on the display; and
- performing the vacuum pressure test periodically.

15. The system of claim 14, wherein the vacuum package contains a getter, and wherein the vacuum pressure test performed by the processing component comprises firing the getter if the second parameter value is below the threshold value.

16. The system of claim 14, wherein the vacuum pressure test performed by the processing component comprises adjusting a setting of the infrared camera system to compensate for performance degradations due to the vacuum pressure condition if the second parameter value is below the threshold value.

17. A non-transitory computer-readable medium which stores information for performing a vacuum pressure test method for an infrared vacuum package assembly, the method comprising:
- changing a first parameter value provided to the infrared vacuum package assembly containing an infrared detector to vary a temperature of the infrared detector while the infrared detector is exposed to a non-varying scene, wherein the first parameter value is a bias voltage value, a bias time value, and/or a bias duty-cycle value;
- measuring a second parameter value associated with the infrared detector based on the changing of the first parameter value, wherein the second parameter value is a time for an output signal of the infrared detector to transition from a first steady state value to a second steady state value; comparing the second parameter value to a threshold value; and
- determining a vacuum pressure test result for the infrared vacuum package assembly based on the comparing of the second parameter value to the threshold value.

18. The computer-readable medium of claim 17, wherein the first parameter value is a bias time value and/or a bias duty-cycle value.

19. The computer-readable medium of claim 17, wherein the second parameter value comprises the bias duty-cycle value that represents a frame time value.

20. The computer-readable medium of claim 17, wherein the method comprises:
- determining a temperature associated with the infrared detector during the measuring of the second parameter value;
- selecting the threshold value from a plurality of threshold values associated with corresponding temperatures based on the temperature from the determining of the temperature;
- displaying the vacuum pressure test result; and
- performing an action for the infrared vacuum package assembly if the second parameter value is below the threshold value, wherein the action includes firing a getter within the infrared vacuum package assembly or adjusting a setting of the infrared vacuum package assembly.

* * * * *